FOOTWEAR ASSEMBLY

Original Filed Jan. 16, 1970

INVENTORS:
WILLIS R. HENDRICKS
RICHARD L. DANFORTH
BY: William H. Myers
THEIR AGENT United States Patent Office Re. 28,236
Reissued Nov. 12, 1974

28,236
FOOTWEAR ASSEMBLY

Willis R. Hendricks and Richard L. Danforth, Palos Verdes Peninsula, Harbor City, Calif., assignors to Shell Oil Company, New York, N.Y.

Original No. 3,589,036, dated June 29, 1971, Ser. No. 880,257, Jan. 16, 1970, which is a continuation-in-part of application Ser. No. 698,990, Jan. 12, 1968, which is a continuation-in-part of application Ser. No. 423,724, Jan. 6, 1965, both now abandoned. Application for reissue May 15, 1972, Ser. No. 253,214
Int. Cl. A43b *13/04*
U.S. Cl. 36—2.5 R 11 Claims

Matter enclosed in heavy brackets [ ] appears in the original patent but forms no part of this reissue specification; matter printed in italics indicates the additions made by reissue.

ABSTRACT OF THE DISCLOSURE

Footwear assemblies are provided in which components comprise certain block copolymers of conjugated dienes with monovinyl arenes or their hydrogenated derivatives.

This application is a continuation-in-part of our copending application, Serial No. 698,990, filed Jan. 12, 1968, now abandoned, which is a continuation-in-part of application, Ser. No. 423,724, filed Jan. 6, 1965, now abandoned.

This invention relates to improvements in footwear. More particularly it relates to the construction and assembly of shoes, boots, slippers, and the like.

In the manufacture of footwear of various types including canvas-top shoes, leather-top shoes, rubbers, boots, and the like, it is often a problem to develop a product having all the physical properties which are desired. A leather sole thick enough to protect the foot is expensive and often is too heavy for wearing comfort. A rubber sole shoe made of the ordinary rubbers requires vulcanization and has a number of properties which are found to be disadvantageous in footwear. For example, when certain vulcanized rubbers are utilized as sole components on shoes, the sole exhibits the same flexural properties in all directions. This results in a certain amount of curling of the edges of the sole along the sides thereof. On the other hand, if vulcanized rubber solings are compounded to avoid this undesirable curling feature then the flex of the sole is substantially reduced and the shoe is thereby too stiff for comfortable wear.

One of the major items of cost in the preparation of footwear containing the previous utilized types of rubber components is that involved in the vulcanization of the components either before or after assembly of the various shoe components into a shoe shape. Not only is the cost of the vulcanization step per se objectionable, but, as is well known, the stamping out of shoe sole slab stock after vulcanization results in a large amount of scrap (about 25 percent by volume) which cannot be reworked and simply must be discarded or ground for use as filler.

At the present time, the low-cost shoe market is largely restricted to plastic materials such as polyvinyl chloride shoe components which do not require vulcanization but inherently possess undesirable properties. These include a lack of skid resistance when wet, stiffening at low temperatures, a lack of proper resilience, and other physical properties which it would be desirable to improve.

It is an object of the present invention to improve the construction of shoes. It is a particular object of the invention to provide shoes and shoe components which do not require vulcanization. It is a special object of the invention to provide shoes having various types of soles of a particular kind of rubber as defined hereinafter which does not require vulcanization and which has a greater degree of flex along one axis than it has along an axis at right angles thereto. It is a special object to provide materials suitable for extrusion of shoe component stocks which do not decompose in the extruder. It is a special object to provide materials for shoe component stocks which can be recycled through extruders and injection molding machines without deleterious effect on the durability of the resultant shoe component. Another object is to provide shoe soles having high skid resistance and good flexibility at low temperatures. An important economic objective is achieved in substantially reducing the shoe fabrication time.

Other objects will become apparent during the following detailed description of the invention.

Figure 1:
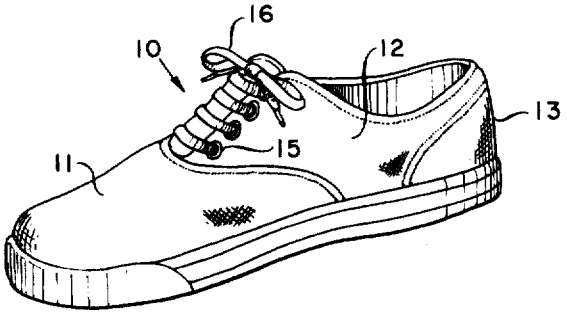
FIG. 1 represents a sketch in perspective of a typical sample of the present invention which in this case is embodied in a lightweight canvas-top shoe.

Now in accordance with the present invention, footwear and the like is provided wherein a component thereof comprises a block copolymer of a monovinyl arene and a conjugated diene, or hydrogenated derivatives thereof.

Where, in the specification and claims reference is made to molecular weights, it will be understood that reference is made to viscosity average molecular weights determined by a relationship between the intrinsic viscosity of the block copolymer and osmotic molecular weight. The molecular weights so determined agree closely with molecular weights obtained from scintillation counting of samples of the block copolymer.

While the present invention is especially directed to shoes and shoe soles as the component comprising the subject block copolymers, the latter may be employed at any point in the shoe construction as in shoe uppers, [show] *shoe* soles, foxing, cements, fillers, counters, laminated components, heels, inner soles, liners, and the like. The block copolymers may be compounded as described more fully hereinafter to suit each of these particular utilities with advantages both in processing and in physical properties being gained.

The block copolymers to be utilized in the formation of shoes and shoe components may either be non-hydrogenated block copolymers or those which have been subjected to hydrogenation, preferably so that at least about 50 percent of the original double bonds in the block copolymer are reduced thereby. Hydrogenation may be complete, random, or selective. Preferably, the diene polymer blocks are hydrogenated to eliminate at least about 80 percent of the aliphatic unsaturation.

The formation of the block copolymers, while not forming an essential aspect of this invention may be briefly described for a fuller understanding thereof. The vinyl arenes which may be employed for the preparation of the block copolymers include especially styrene, alphamethyl styrene, vinyl toluene as well as their homologs and analogs and mixtures thereof. The conjugated dienes useful for the present purpose are those preferably containing from 4 to 8 carbon atoms per molecule and preferably from 4 to 6 carbon atoms per molecule, especially butadiene and isoprene and mixtures thereof. The block copolymers may be formed by a number of different types of processes such as the following:

A vinyl arene such as styrene may be polymerized in substantially inert hydrocarbon medium in the presence of a monofunctional alkali metal alkyl compound such as lithium alkyl to form an initial polymer block carbanion A terminated with a lithium ion. Without further treatment, a conjugated diene such as butadiene or isoprene is introduced and block copolymerization effected to produce the intermediate block copolymer carbanion A—B, associated with the alkali metal ion such as lithium. Finally, a vinyl arene such as styrene is introduced and polymerization continued to form the desired polymer A—B—A.

A second process may be referred to as a coupling process wherein the first stage is as described above to form the initial polymer block A terminated with lithium, followed by introduction of the conjugated diene to form a polymer block thereof having a molecular weight only half of that desired in the final product. At this stage a coupling agent is then added to form the desired three-block polymer A—B—A, in this case containing an insignificant coupling link in the center block B. This coupling is ignored in the generic description of the block polymers in this specification.

[Multifunctional coupling agents may be used to form non-linear molecules. Thus, the invention contemplates the use of linear configurations, e.g., $A—(B—A)_n$ and non-linear configurations, e.g., $A—B—(B—A)_n$ wherein each A is a monovinyl arene polymer block and each B is a conjugated diene polymer block. Any adjacent substantially identical blocks are considered as a single block in the following discussion of molecular weights.]

An optional process for the preparation of the subject block copolymers comprises the initial formation of the center block of conjugated diene by the use of difunctional catalyst such as dilithium naphthalene and the like, to form the center polymer block terminated at both ends with a metallic radical such as lithium. Thereafter, the vinyl arene monomer may be injected into the system and both of the terminal blocks formed simultaneously.

One of the essential aspects of the present invention comprises the discovery that only a very restricted class of the subject block copolymers (including their hydrogenated counterparts) may be readily employed for the formation of shoes and their components. The restriction is due primarily to performance and processing considerations since if polymers having average molecular weights lower than those specified hereinafter are employed the physical properties of the resulting block copolymers are relatively poor and lacking in tensile strength. On the other hand, if the polymer blocks have molecular weights greater than those specified hereinafter, processability of the resulting block copolymers rapidly becomes difficult or even impossible without excessive modification with extender oils and the like which, in turn, tends to degrade the physical properties desired in end products.

Therefore in accordance with an essential aspect of the invention, the vinyl arene polymer blocks should have average molecular weights between about 9,000 and about 30,000 and preferably between about 14,000 and about 25,000 at the same time, the conjugated diene polymer blocks should have average molecular weights between about *40,000* [35,000] and about *80,000* [130,000] and preferably between about *65,000* [40,000] and about *75,000* [80,000], the weight ratio of vinyl arene polymer blocks to conjugated diene polymer blocks being between about *25:75* and about *40:60* [60:40 usually between about 30:70 and 40:60].

The ranges of molecular weights depend, within these limits, upon the type of compositions. Thus, unfilled stocks desirably comprise polyvinyl arene blocks of 9,000–15,000 molecular weight and polydiene blocks of 40,000–50,000 molecular weight. Filled stocks, on the other hand, have polyvinyl arene blocks of 12,000–30,000 molecular weight and diene blocks of 50,000–80,000 molecular weight.

Another essential reason for limiting the class of block copolymers to those having the components and molecular weights described above, lies in the ability of the defined class to form a rubber having the stress-strain properties of a vulcanized rubber without the necessity for going through the vulcanization step normally employed with other types of rubbers.

While the generic concept of the present invention comprises the utilization of the highly restricted class of block copolymers defined above in the formation of shoes and shoe components, in many cases the block copolymers will be modified with compounding ingredients to impart certain physical properties desired in the finished product. This will depend not only upon the footwear article per se but upon the method of manufacture. The following discussion, while restricted to the alternatives involved in various kinds of shoe soling and their manufacture, applies with modifications apparent to those skilled in the art of shoe manufacture to the preparation of other shoe components. Three principal types of shoe soling are particularly contemplated: Slab stock is prepared by a milling or extrusion process to form a sheet of the desired sole thickness. The sole shapes are then stamped out of the sheet and thereafter attached to the shoe upper. The use of the block copolymers of the present invention offers the advantages of easier processing, better wear, elimination of the vulcanization step, capability of recycling scrap without harming resultant shoe quality, and a peculiarity inherent in the particular block copolymers relative to flexibility in a desired direction combined with stiffness in the perpendicular direction. More especially, the soling slab has been found to have a greater flaxibility perpendicular to (or normal to) the direction of extrusion than it has in the direction of extrusion. This useful aspect may be capitalized upon by cutting the sole shapes from the slab perpendicular to (or normal to) the direction of extrusion so as to obtain a sole having greater flexibility around the short axis of the sole combined with stiffness around the long axis of the sole, thus preventing the undesirable curling up around the edges experienced with other types of rubber soles.

For this type of shoe soling, it is preferred to employ 100 parts by weight of the subject block copolymer, [25] *35–125* [preferably 35–125] phr. (parts per 100 of rubber) of a polystyrene; [5–90 (preferably] 5–60[)] phr. of a rubber extending oil and 0–*275* [350 (preferably 0–275)] phr. of a finely divided filler. The block copolymers especially suited for slab stock have terminal blocks of 14,000–25,000 molecular weight and center elastomeric blocks of [85,000–125,000 (preferably] 65,000–75,000[)] molecular weight. The following table shows that it is possible to vary the individual components within the reasonable limits while obtaining slab soling stock suitable for a number of types of shoes. The compounds include components expressed as parts by weight, the block copolymer being polystyrene-polybutadiene-polystyrene having block molecular weight of [20,000–105,000–20,000] *14,000–72,000–14,000.*

TABLE I.—SLAB SOLING STOCKS

| Compound | A | B | C |
|---|---|---|---|
| Block copolymer | 100 | 100 | 100 |
| Polystyrene (crystal grade) | 70 | 55–70 | *50* [60] |
| Soft clay (filler) | 30 | 100 | 250 |
| Low molecular weight polyalphamethyl styrene | | *15* [30] | *15–25* [50] |
| Naphthenic oil | 20 | *20* [30] | *20* [40] |

It will be noted in the above formulations that two types of polystyrenes are employed. The crystal grade polystyrene is utilized for its function as a reinforcing agent which is highly compatible with the block copolymer. On the other hand, the low molecular weight polyalpha-methyl styrene is employed as a processing aid during the processing of the shoe sole into its slab form.

Other large classes of footwear are referred to as injection molded footwear and hand built footwear. These classes include not only footwear such as boots and the like comprising molded articles entirely made of a single material, but also shoe components which are molded either directly onto other shoe components or formed for later attachment to the rest of the shoe. The class is especially considered with the preparation of boots and with canvas top shoes wherein the canvas top is directly attached by the molding process to the block copolymer sole. It will be recognized by those familiar with the shoe making art that a somewhat different type of compound is employed for this purpose to permit ready moldability thereof at temperatures which will effect a strong attachment between the molded part of the shoe and any nonrubber components such as a canvas upper. Consequently, the compositions for injection molded stock include those comprising 100 parts by weight of the block copolymer, [25–100 (preferably] 50–85[)] phr. of a polystyrene, 60–90 [150 (preferably 60–150)] phr. of a rubber extending oil, and 0–150 phr. of a finely divided filler. The most effective block polymers for injection molded footwear have end blocks A with molecular weights of *10,000–20,000* [25,000] and center blocks B with molecular weights of [45,000–90,000 (preferably] 45,000–65,000[)].

Due to the method by which shoe components are formed, e.g., by molding in this type of application, a somewhat different formulation is required both in the block copolymer and in the component modifying the same. For instance, a relatively higher portion of a rubber extender oil is employed but at the same time a block copolymer having a higher ratio of the vinyl arene polymer block is utilized. The following formulation is typical of those which may be employed for injection molding purposes.

TABLE II

| | Injection molded stock, phr. |
|---|---|
| Block copolymer | 100 |
| Polystyrene (crystal grade) | 60 |
| Soft clay | 80 |
| $TiO_2$ | 10 |
| Naphthenic oil | 75 |
| Low mol weight polystyrene | 15 |

The block copolymer employed in the above formulation was polystyrene-polybutadiene-polystyrene having block molecular weights of 14,000–53,000–14,000. [When the block polymer had block molecular weights of 22,000–50,000–22,000, the oil was increased to 100 phr.]

The subject block copolymer slab stock and injection molded soling have the advantages of being capable of compounding for easily processable stocks which do not require vulcanization. Thus, it is possible to reuse scrap, eliminate the scorch problems associated with vulcanization, and simplify processing. Compared with the polyvinyl chloride injection molded formulations, the formulation given above has the substantial advantages of flexibility at low temperatures, high coefficient of friction, true rubberlike elasticity and feel, and greater stiffness for a given hardness. The latter feature provides greater resistance "stone-bruising" during wear.

In addition to the above general types of soling compositions, another class contemplated is that of calendered soling wherein the block copolymer compounds are sheeted through embossing calenders and the soles are then cut out from the unvulcanized sheet. The sole is cemented to the upper, a binding (foxing) strip is applied and the assembled shoe is finished without the necessity for vulcanization normally required. The advantages gained are in general those described for slab stock and particularly for injection molded soling.

While the compositions especially contemplated are those described above, it is also contemplated to form foam rubber shoe components such as inner soles, laminates for outer soles, laminates to be combined with other shoe materials such as leather, polyvinyl chloride and the like. The compositions may be varied with respect to the ratio of thermoplastic (polyvinyl arene) blocks so as to provide a controlled degree of flexibility in the end product.

The supplementary components contained in the several compounds referred to hereinabove comprise particularly polystyrenes of two general types. Those of high molecular weight, e.g., over 75,000 molecular weight are contemplated for use as reinforcing agents while the relatively low molecular weight polystyrenes are useful not only in imparting stiffness but also as processing aids without sacrificing tensile. They may be used in conjunction with extending oils and resinlike extenders including coumarone-indene resins, petroleum hydrocarbon resins, rosin, phenol-formaldehyde, and glycerol esters. Processing oils include not only esters such as dioctyl phthalate and the like but especially the hydrocarbon oils having not more than about 30 percent aromatic hydrocarbon content referred to either as naphthenic or aliphatic hydrocarbon oils. However, for black stocks the aromatic residual oils may be employed.

Summarizing the above, shoe sole compositions especially contemplated have the general formulation as follows:

Block copolymer as defined above 100 parts by weight, polystyrene [25–125 (preferably] 35–125[)] phr., extending oil [5–150 (preferably] 5–90[)] phr., and filler [0–350 (preferably] 0–300[)] phr.

The fillers utilized in the compositions especially contemplated are well known in the art and include clay, titanium dioxide, carbon blacks, whiting (calcium carbonate), and other pigments as well as fibrous fillers such as cellulosic fibers, sawdust, ground cork, etc.

Figure 2:
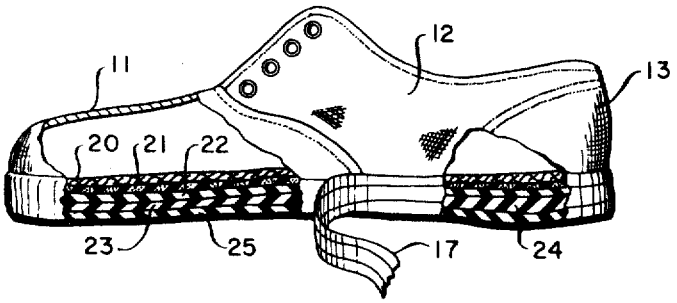
FIG. 2 is a longitudinal section through the shoe to show construction of several parts and to show in detail an optional fabrication of the sole and its relationship to the upper.

In FIGS. 1 and 2, 10 represents the shoe having a top formed from a forward toe and vamp piece 11, a body piece or instep portion 12, and the heel section or quarter 13. This much is conventional and the parts form the uppers. The optional trim or binding 17 (foxing) gives the edges a finish; grommets 15 finish eyelets for lacing 16. The individual parts vary as the styling is varied. The assembly of uppers is bound to the sole in this type of shoe by and under a rubber binding called foxing which passes entirely around the shoe at the level of the sole, extending a short distance onto the uppers. It is firmly adhered both to the uppers and to the sole and may comprise a plastic binding or more preferably a block copolymer strip comprising a copolymer compound of the present invention.

In one type of light-shoe sole assembly such as illustrated in FIG. 2, the sole consists of an inner fabric or block copolymer lining 20, somewhat exaggerated in the drawing, under which is a thin layer of sponge block copolymer rubber composition 21, which is followed by a thin layer of block copolymer sheeting 22 and 23, which is formed to provide a somewhat thickened section at the heel 24. The outer sole 25 is a block copolymer composition of the present invention to provide a wearing surface which may be flat, corrugated, or patterned in any desired manner.

One of the items of cost in shoe manufacture relates to rate at which a given shoe component can be formed. For example, it has been found that slab soling stock comprising the subject block copolymers can be extruded at a rate of about 5 percent faster than a comparable polyvinyl chloride slab soling stock. In comparative tests involving injection molding of a sole onto a basketball shoe upper, a polyvinyl sole required "total index time" of 19 seconds, while a block copolymer sole required 18 seconds.

We claim as [my] *our* invention:

1. A footwear construction including an upper component and a sole component wherein at least one of said components comprises unvulcanized-block copolymer *having the structure A—B—A* of the group consisting of polymers of a monovinyl arene and of a conjugated diene, and hydrogenated derivatives of said polymers wherein the original unsaturation has been reduced at least 50 percent by hydrogenation, the monovinyl arene blocks *A* having an average molecular weight between about 9,000 and about 30,000 and the conjugated diene blocks *B* having an average molecular weight between about *40,000* [35,000] and about *80,000* [130,000] the weight ratio of monovinyl arene polymer blocks to conjugated diene polymer blocks being between about 25:75 and about [60:40] *40:60*.

[2. Shoe sole comprising:

1. 100 parts by weight of an unvulcanized block copolymer having the general configuration polystyrene-polybutadiene-polystyrene wherein each polystyrene block has an average molecular weight between about 9,000 and 30,000, and the polybutadiene block has an average molecular weight between about 35,000 and about 130,000 the weight ratio of monovinyl arene polymer blocks to conjugated diene polymer blocks being between about 25:75 and about 60:40;

2. 25–125 phr. of a polystyrene having a molecular weight of at least 75,000;
3. 5–90 phr. of a rubber extending oil; and
4. 0–350 phr. of a finely divided filler.]

[3. An injection molded footwear comprising:

1. 100 parts by weight of an unvulcanized block copolymer having the general configuration polystyrene-polybutadiene-polystyrene wherein each polystyrene block has an average molecular weight between about 10,000 and 25,000 and the polybutadiene block has an average molecular weight between about 40,000 and about 90,000 the weight ratio of monovinyl arene polymer blocks to conjugated diene polymer blocks being between about 25:75 and about 60:40;

2. 25–110 phr. of a polystyrene having a molecular weight of at least 75,000;
3. 60–150 phr. of a rubber extending oil; and
4. 0–150 phr. of a finely divided filler.]

[4. A slab shoe soling comprising:

1. 100 parts by weight of an unvulcanized block copolymer having the general configuration polystyrene-polybutadiene-polystyrene wherein each polystyrene block has an average molecular weight between about 14,000 and about 25,000 and the polybutadiene block has an average molecular weight between about 85,000 and 125,000, the weight ratio of monovinyl arene polymer blocks to conjugated diene polymer blocks being between about 25:75 and about 40:60;

2. 25–125 phr. of a polystyrene having a molecular weight of at least 75,000;
3. 5–90 phr. of a rubber extending oil; and
4. 0–350 phr. of a finely divided filler.]

5. A footwear construction according to claim 1 wherein the block copolymer has the general configuration

A—B—A wherein each A is a [monovinyl arene] *styrene* polymer block and B is a [conjugated diene] *butadiene* polymer block.

6. A footwear construction according to claim 1 wherein the sole comprises an extruded block copolymer composition, the length of the sole being perpendicular to the direction of extrusion.

7. A footwear construction according to claim 1 including an upper component and a sole component wherein at least one of said components comprises an unvulcanized block copolymer [of the group consisting of polymers] having a general configuration

A—B—A wherein each A is a polymer block of a monovinyl arene and B is a polymer block of a congugated diene[, and hydrogenated derivatives of said polymers wherein the original unsaturation has been reduced at least 50 percent by hydrogenation,] the monovinyl arene blocks A having an average molecular weight between about 9,000 and about 30,000 and block B having an average molecular weight between about 40,000 and about 80,000 the weight ratio of monovinyl arene polymer blocks to conjugated diene polymer blocks being between about 25:75 and about 40:60.

8. Shoe sole composition comprising 1. 100 parts by weight of an unvulcanized block copolymer having the general configuration polystyrene-polybutadiene-polystyrene wherein each polystyrene block has an average molecular weight between about 9,000 and about 30,000 and the polybutadiene block has an average molecular weight between about 40,000 and about 80,000 the weight ratio of monovinyl arene polymer blocks to conjugated diene polymer blocks being between about 25:75 and about 40:60;

2. 35–125 phr. of a polystyrene having a molecular weight of at least 75,000;
3. 5–90 phr. of a rubber extending oil; and
4. 0–300 phr. of a finely divided filler.

9. An injection molded footwear composition comprising:

1. 100 parts by weight of an unvulcanized block copolymer having the general configuration polystyrene-polybutadiene-polystyrene wherein each polystyrene block has an average molecular weight between about 10,000 and 20,000 and the polybutadiene block has an average molecular weight between about 45,000 and about 65,000 the weight ratio of monovinyl arene polymer blocks to conjugated diene polymer blocks being between about 25:75 and about 40:60;

2. 50–85 phr. of a polystyrene having a molecular weight of at least 75,000
3. 60–90 phr. of a rubber extending oil; and
4. 0–150 phr. of a finely divided filler.

10. A slab shoe soling composition comprising:

1. 100 parts by weight of an unvulcanized block copolymer having the general configuration polystyrene-polybutadiene-polystyrene wherein each polystyrene block has an average molecular weight between about 14,000 and about 25,000 and the polybutadiene block has an average molecular weight between about 65,000 and 75,000 the weight ratio of monovinyl arene polymer blocks to conjugated diene polymer blocks being between about 25:75 and about 40:60;

2. 35–125 phr. of a polystyrene having a mloecular weight of at least 75,000;
3. 5–60 phr. of a rubber extending oil; and
4. 0–300 phr. of a finely divided filler.

11. A shoe comprising an upper component and a sole component wherein the sole is a composition according to claim 8.

12. A composition comprising:

1. 100 parts per weight of an unvulcanized block copolymer having the general configuration *polystyrene-polybutadiene-polystyrene*

[wherein polystyrene]

wherein each polystyrene block has an average molecular weight between about 9,000 and about 30,000, and the polybutadiene block has an average molecular weight between about 35,000 and about 130,000 the weight ratio of monovinyl arene polymer blocks to conjugated diene polymer blocks being between about 25:75 and about 60:40;

2. [35] *25*–125 phr. of a polystyrene having a molecular weight of at least 75,000;
3. 5–90 phr. of a rubber extending oil; and
4. 0–*300* [350] phr. of a finely divided filler.

13. A composition comprising:

1. 100 parts by weight of an unvulcanized block copolymer having the general configuration polystyrene-polybutadiene-polystyrene wherein each polystyrene block has an average molecular weight between about 10,000 and [25,000] *20,000* and the polybutadiene block has an average molecular weight between about [40,000] *45,000* and about [90,000] *65,000* the weight ratio of monovinyl arene polymer blocks to conjugated diene polymer blocks being between about 25:75 and about [60:40] *40–60*;

2. 25–110 phr. of a polystyrene having a molecular weight of at least 75,000;
3. 60–*90* [150] phr. of a rubber extending oil; and
4. 0–150 phr. of a finely divided filler.

14. A composition comprising:

1. 100 parts by weight of an unvulcanized block copolymer having the general configuration polystyrene-polybutadiene-polystyrene wherein each polystyrene block has an average molecular weight between about 14,000 and about 25,000 and the polybutadiene block has an average molecular weight between *65,000* [85,000] and *75,000,* [125,000] the weight ratio of monovinyl arene polymer blocks to conjugated diene polymer blocks being between about 25:75 and about 40:60;

2. [25] *35*–125 phr. of a polystyrene having a molecular weight of at least 75,000;

3. *5–60* [90] phr. of a rubber extending oil; and
[3] *4.* 0–*300* [350] phr. of a finely divided filler.

References Cited

The following references, cited by the Examiner, are of record in the patented file of this patent or the original patent.

UNITED STATES PATENTS

| | | | |
|---|---|---|---|
| 2,995,839 | 8/1961 | Cronin | 36—9 |
| 3,352,032 | 11/1967 | Yomaguchi | 36—9 |
| 3,473,240 | 10/1969 | Martin et al. | 36—2.5 R |
| 3,484,959 | 12/1969 | Torgerson | 36—9 |

PATRICK D. LAWSON, Primary Examiner

U.S. Cl. X.R.

36—32